US009336216B2

(12) United States Patent
Kapsiar et al.

(10) Patent No.: US 9,336,216 B2
(45) Date of Patent: May 10, 2016

(54) COMMAND-BASED DATA MIGRATION

(71) Applicant: CA, Inc., Islandia, NY (US)

(72) Inventors: Juraj Kapsiar, Liptovsky Mikulas (SK); Rostislav Julinek, Benatky nad Jizerou (CZ); Pavel Novak, Praha (CZ)

(73) Assignee: CA, Inc., New York, NY (US)

( * ) Notice: Subject to any disclaimer, the term of this patent is extended or adjusted under 35 U.S.C. 154(b) by 127 days.

(21) Appl. No.: 13/744,172

(22) Filed: Jan. 17, 2013

(65) Prior Publication Data

US 2014/0201146 A1    Jul. 17, 2014

(51) Int. Cl.
*G06F 17/00* (2006.01)
*G06F 17/30* (2006.01)

(52) U.S. Cl.
CPC ................................ *G06F 17/30079* (2013.01)

(58) Field of Classification Search
CPC ............ G06F 17/303; G06F 17/30306; G06F 17/30079; G06F 17/30569; G06F 17/30563; G06F 17/30575; G06F 17/2264
See application file for complete search history.

(56) References Cited

U.S. PATENT DOCUMENTS

| | | | | |
|---|---|---|---|---|
| 5,403,639 A | * | 4/1995 | Belsan | G06F 17/30067 |
| 5,815,482 A | * | 9/1998 | Rope | G06F 3/0613 |
| | | | | 369/112.05 |
| 5,819,296 A | * | 10/1998 | Anderson et al. | |
| 7,730,025 B1 | * | 6/2010 | Rice et al. | 707/609 |
| 7,970,732 B2 | * | 6/2011 | Jernigan et al. | 707/602 |
| 8,041,760 B2 | * | 10/2011 | Mamou et al. | 709/200 |
| 2002/0111972 A1 | * | 8/2002 | Lynch | G06F 3/14 |
| | | | | 715/236 |
| 2003/0130980 A1 | * | 7/2003 | Bell et al. | 707/1 |
| 2005/0149536 A1 | * | 7/2005 | Wildes et al. | 707/100 |
| 2007/0136353 A1 | * | 6/2007 | Hsiao et al. | 707/102 |
| 2007/0168435 A1 | * | 7/2007 | Moraca, Jr. | G06F 17/30073 |
| | | | | 709/206 |
| 2009/0077099 A1 | * | 3/2009 | Haustein et al. | 707/10 |
| 2009/0150894 A1 | * | 6/2009 | Huang | G06F 3/061 |
| | | | | 718/104 |
| 2012/0265726 A1 | * | 10/2012 | Padmanabhan et al. | 707/602 |
| 2013/0111094 A1 | * | 5/2013 | Culter | G06F 13/00 |
| | | | | 710/300 |

* cited by examiner

*Primary Examiner* — Angelica Ruiz
(74) *Attorney, Agent, or Firm* — Myers Bigel & Sibley, P.A.

(57) ABSTRACT

A data migration method includes retrieving data having a first data format that is associated with a first system, and generating at least one logical command that is configured to be interpreted by a migration utility. The logical command is translated to one or more equivalent physical commands that are executable by the second system, and is provided to the second system to recreate the data in accordance with a second data format that is associated with the second system. The command can be provided to the second system for execution thereby to define a system state in the second system that is equivalent to a system state of the first system with respect to the data having the first data format.

20 Claims, 6 Drawing Sheets

COMMAND-BASED DATA MIGRATION

BACKGROUND

The present disclosure relates to computing systems, and in particular to data migration in computing systems.

Data is typically stored on various media in files or databases, and can be generated and consumed by software applications which can support business processes. The process of transferring data between storage types, formats, or computer systems (both physical and virtual) may be referred to as data migration. Data migration may be used when organizations or individuals change computer systems or upgrade to new systems, and/or when systems merge, and can be performed programmatically to achieve an automated migration.

For example, when changing from a former vendor's software A to a new vendor's software B, data migration can be performed to transfer data from a format associated with software A to a different format associated with software B. Likewise, when performing a major release software upgrade, data migration may be used to transfer data from data structures associated with the previous software version A to data structures associated with the newer software version B, which may include significant architectural changes. For example, an older software version A may include an embedded data persistence infrastructure, while the infrastructure may be separated into a stand-alone product in the newer software version B.

To achieve an effective data migration procedure, data on the previous system can be mapped to the new system by relating previous data format(s) to the new system's format(s) and requirements. Programmatic data migration may involve many phases, and typically includes data extraction, where data is read from the old system, and data loading, where data is written to the new system. However, direct migration of data on the database level may lead to a corrupted inner logic of the data structure in the new system. This inner logic may often be hidden or otherwise not readily apparent. Other difficulties associated with the migration can include downtime of both systems during the entire migration process.

BRIEF SUMMARY

According to an embodiment described herein, a data migration method includes retrieving data having a first data format that is associated with a first system, and generating at least one command that is configured to be executed by a second system to recreate the data in accordance with a second data format that is associated with the second system. The command can be provided to the second system for execution thereby to define a system state in the second system that is equivalent to a system state of the first system including the data having the first data format. For example, the first system may be a source system including data to be migrated stored therein, and the second system may be a target or destination system to which the data is to be migrated.

In an embodiment, the command may be generated without or independent of relating the first data format to the second data format. In an embodiment, the command may be a lower level or native command with respect to the second system. For example, the command may be a physical layer command that is executable by the second system.

In an embodiment, the command may be generated according to a public software interface associated with the second system, such as a second public application program interface (API).

In an embodiment, an origin of the data having the first data format in the first system may be determined, and the command may be generated responsive to determining the origin of the data having the first data format. For example, at least one logical command may be created according to the origin of the data having the first data format, and the logical command may be translated to at least one physical command that is executable by the second system to recreate the data in accordance with the second data format.

In an embodiment, the logical command may be a non-native command that is distinct from the physical commands executable by the first and second systems. The logical command may be indicative of the origin of the data having the first data format.

In an embodiment, the origin of the data having the first data format may be determined by determining a physical command executable by the first system to result in the data having the first data format. The logical command may be indicative of the physical command that is executable by the first system.

In an embodiment, the origin of the data having the first data format may be determined by determining a source from which the data having the first format was imported. The command may be executable by the second system to import the data from the source.

In an embodiment, the origin of the data having the first data format may be determined by analyzing one of a relationship, modification, configuration setting, and user preference associated with the data having the first format.

In an embodiment, the first system may be configured to resume operation after retrieval of the data having the first format therefrom and/or otherwise prior to completion of the data migration to the second system.

In an embodiment, the data having the first format may be exported from the first system using a public software interface associated with the first system, such as a first public application program interface (API).

In an embodiment, one or more of the retrieving and generating may be repeatedly performed for verification purposes. For example, prior to providing the command to the second system for execution thereby, the command may be provided to a testing environment for verification.

In an embodiment, the logical command may be translated to a physical command that is executable by the first system to recreate the data in accordance with the first data format. For example, the physical command may be executed by the first system responsive to deleting the data having the first data format therefrom to remove inconsistencies and/or inaccuracies therein.

According to an embodiment described herein, a computer system includes a data migration utility comprising an exporter module and an importer module. The exporter module is configured to retrieve data having a first data format associated with a first system. The importer module is configured to generate a command that is executable by a second system to recreate the data in accordance with a second data format associated with the second system. For example, the first system may be a source system including data to be migrated stored therein, and the second system may be a target or destination system to which the data is to be migrated. The importer may be configured to provide the command to the second system for execution thereby to define a system state in the second system that is equivalent to that of the first system including the data having the first data format.

In an embodiment, the importer module is configured to generate the command independent of a relationship between the first data format and the second data format or otherwise without relating the first data format to the second data format.

In an embodiment, the command may be a lower level or native command with respect to the second system. For example, the command may be a physical layer command that is executable by the second system.

In an embodiment, importer may be configured to generate the command according to a public software interface associated with the second system, such as a second public application program interface (API).

In an embodiment, the exporter module may be configured to determine an origin of the data having the first data format in the first system. The importer module may be configured to generate the command responsive to determination of the origin of the data having the first data format. For example, the exporter module may be configured to create a logical command according to the origin of the data having the first data format, and the importer module may be configured to translate the logical command to the physical command that is executable by the second system.

In an embodiment, the exporter module may be configured to determine a physical command executable by the first system to result in the data having the first data format. The logical command may be indicative of the physical command (or commands) executable by the first system.

In an embodiment, the data migration can be performed in a virtual and/or physical environment.

Other systems, methods, and/or computer program products according to some embodiments will become apparent to one with skill in the art upon review of the following drawings and detailed description. It is intended that all such additional embodiments, in addition to any and all combinations of the above embodiments, be included within this description, be within the scope of the present disclosure, and be protected by the accompanying claims.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
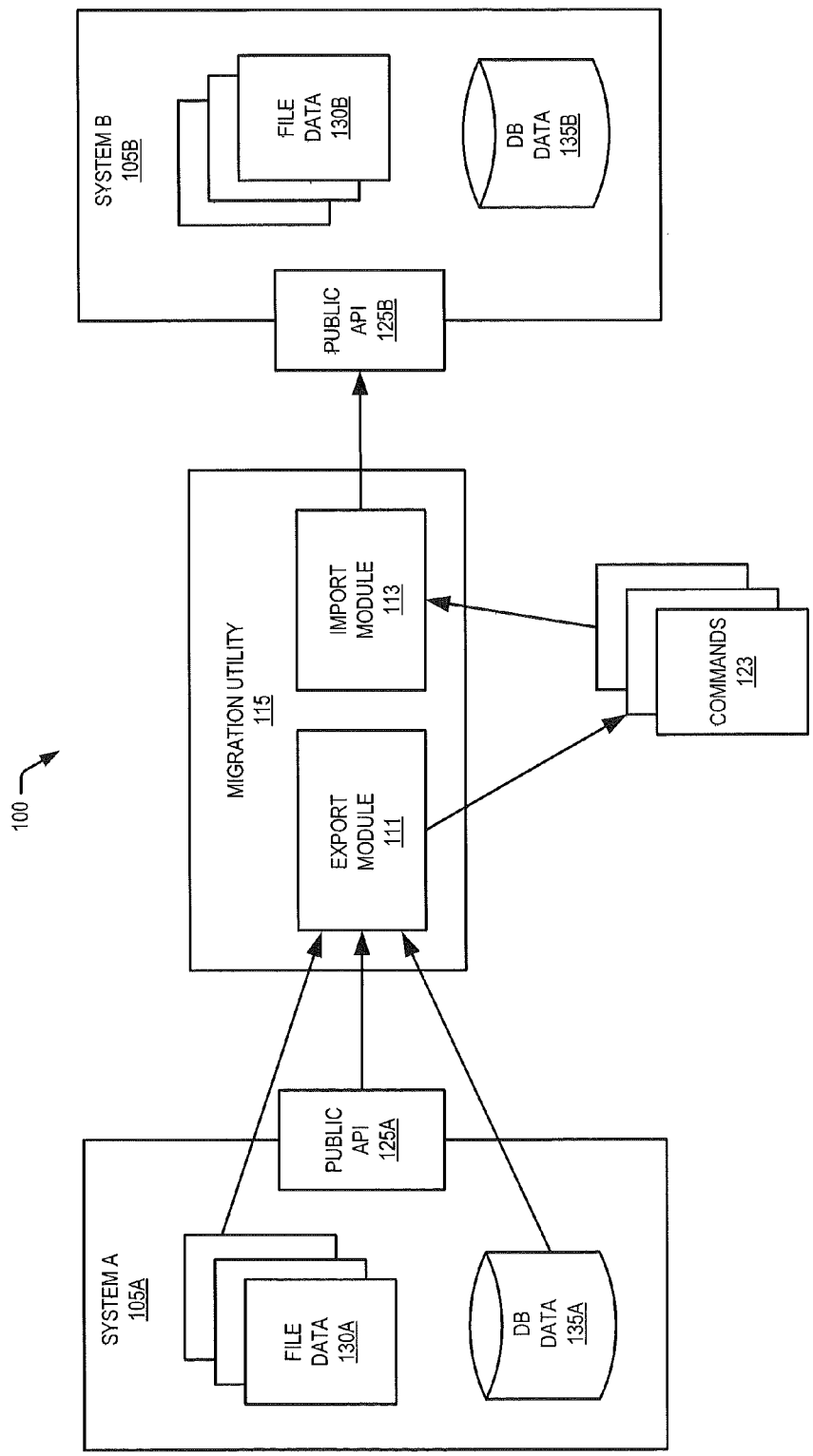
FIG. 1 is a block diagram illustrating a computing system that supports command-based data migration in accordance with an embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," "processor," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. Elements described as being "to" perform such functions/acts may be configured, operable, or otherwise structured to do so.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Embodiments of the present disclosure will be described more fully hereinafter with reference to the accompanying drawings. Other embodiments may take many different forms and should not be construed as limited to the embodiments set forth herein. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

Unless otherwise defined, all terms (including technical and scientific terms) used herein have the same meaning as commonly understood by one of ordinary skill in the art to which the present disclosure belongs. It will be further understood that terms used herein should be interpreted as having a meaning that is consistent with their meaning in the context of this specification and the relevant art and will not be interpreted in an idealized or overly formal sense unless expressly so defined herein.

As described herein, a computing system or environment may include one or more hosts, operating systems, peripherals, and/or applications. Machines in a same computing system or environment may have shared memory or resources, may be associated with the same or different hardware platforms, and/or may be located in the same or different physical locations. Computing environments described herein may refer to a virtualized environment (such as a cloud environment) and/or a physical environment. Managed machines described herein may refer to physical or virtual machines (VMs). As further described herein, a production machine, system, or environment is one that is configured to actively perform operations or tasks associated with providing one or more computing services (including processing and/or storage services). In contrast, a testing machine, system, or environment performs operations or tasks distinct from or otherwise not associated with the service(s) provided by the production machine.

Some embodiments of the disclosure arise from realization that, when migrating data between a source system and a destination system having different data structures or other different data formats by transferring and mapping the data from a first/source system format to a second/destination system format, problems relating to system downtime and/or data integrity may be encountered. Accordingly, some embodiments described herein provide data migration methods and systems that focus on the higher level commands that result in a desired data state, instead of the transfer of the data from the source to the destination system. In particular, rather than mapping data from the first format associated with the source system to the second format associated with the destination system, command-based data migration according to embodiments described herein involves an export phase and an import phase. The export phase extracts the data in the first format from the source system and reconstructs commands based on the origin(s) of the data in the source system. The import phase translates the commands into commands that are configured to be executed by the destination system to recreate the data in the second format, in order to result in a destination image or system state in the destination system that is equivalent to the source image or system state of the source system having the first format data stored therein with respect to the migrated data. This can include, for example, modeling data entities, relationships between data entities, modifications of the data entities, setting configuration options, and/or user preferences. Embodiments described herein thus allow for the migration of data without transferring, mapping, or otherwise relating the data format of the source system to the data format of the destination system. Furthermore, as the data is recreated by the destination system itself in its own format, rather than being transferred from the source system and mapped to the destination system format, data integrity may be preserved throughout the entire migration process, as well as for subsequent operations.

FIG. 1 is a block diagram illustrating an example computing environment 100 that supports command-based data migration in accordance with an embodiment of the present disclosure. As shown in FIG. 1, a computing environment 100 includes a first system (e.g., a source system) 105a, a second system (e.g., a destination system) 105b, and a migration utility 115 that is configured to migrate data from the first system 105a to the second system 105b. The systems 105a, 105b, and/or the migration utility 115 may include, without limitation, a mainframe computer platform, personal computer, mobile computer (e.g., tablet computer), server, wireless communication terminal (e.g., cellular data terminal), or any other appropriate program code processing hardware. The systems 105a, 105b, and/or the migration utility 115 may include computer resources such as a processing hardware (e.g., central processing unit, CPU); networking controllers; communication controllers; a display unit; a program and data storage device; memory controllers; input devices (such as a keyboard, a mouse, etc.) and output devices such as printers. The processing hardware may include circuit(s) configured to execute computer program code from memory device(s), described below as a computer readable storage medium, to perform at least some of the operations and methods described herein, and may be any conventional processor circuit(s), such as the AMD Athlon™ 64, or Intel® Core™ Duo.

The systems 105a and/or 105b may further include respective data storage spaces, which may include any suitable devices capable of storing computer-readable data and program code, as well as logic in the form of software applications, random access memory (RAM), or read only memory (ROM), removable media, or any other suitable memory component. In particular, as shown in FIG. 1, the first system 105a includes file data 130a and database data 135a stored therein. The file data 130a and database data 135a are stored in the first system 105a according to a first data format, structure, or model that is associated with the first system 105a, thereby defining a first system state in the first system 105a. However, the second system 105b is configured to use data having a second data format, structure, or model that is different from and/or otherwise incompatible with that used by the first system 105a. As such, the data 130a, 135a stored in the first system 105a in accordance with the first data format may be unusable by the second system 105b.

The migration utility 115 can be used to migrate the data 130a, 135a from the first system 105a to the second system 105b, such that the second system 105b likewise includes file data 130b and database data 135b stored therein. However, rather than transferring and/or mapping the data 130, 135 from the first format to the second format, the migration utility 115 is configured to reconstruct or recreate the data 130, 135 in the second format, as described in detail below. The file data 130b and database data 135b are then stored in the second system 105b according to the second data format, thereby resulting in a system state in the second system 105b that is equivalent to that of the first system 105a with respect to the migrated data 130, 135.

In particular, the migration utility 115 includes an export module 111 and an import module 113. The export module 111 is configured to extract data to be migrated (such as the file data 130a and the database data 135a) from the first system 105a. In extracting the data 130a, 135a, the export module 111 may utilize a public software interface (such as a public application program interface (API) 125a) that is associated with the first system 105a. Based on the extracted data 130a,135a itself and/or other knowledge of the system 105a, the export module 111 is configured to determine how the data 130a, 135a was created, originated, or otherwise came to be stored or in the first system 105a, and to generate one or more commands 123 that are indicative of the origin of the data 130a, 135a with respect to the first system 105a. The commands 123 may be high-level commands or other commands that are independent of or otherwise unrelated to the particular implementations of the first system 105a and/or the second system 105b. The import module 113 is configured to retrieve the commands 123 generated by the export module 111, execute or translate these commands 123 into one or more commands that are executable by the second system 105b, and provide the translated commands to the second system 105b to be executed. In translating the commands 123 into commands that are executable by the second system 105b, the import module 113 may utilize a public software interface (such as a public application program interface (API) 125b) that is associated with the second system 105b.

After receiving the translated commands from the import module 113, the second system 105b is configured to execute the translated commands to re-create the data stored in the first system 105a in the second system 105b in accordance with the second format, resulting in file data 130b and database data 135b. The second system 105b is configured to store the resulting data 130b, 135b having the second format at appropriate locations therein, thereby defining a system state in the second system 105b that is equivalent to the system state of the first system 105a with respect to the data 130a, 135a stored therein. The data is thus reconstructed or recreated in the second format without transferring the data from the first system 105a to the second system 105b, and moreover, without relating the first format to the second format. In other words, the data 130, 135 is recreated in the second format independent of a relationship between the first format and the second format.

The export module 111 and the import module 113 may separately and/or independently interact with the first system 105a and the second system 105b, respectively, such that the first system 105a may not be required to wait until the data stored therein has been migrated to the second system 105b and thus can resume operation prior to completion of the migration process. This may reduce and/or minimize downtime of the first system 105a during the migration process, especially in situations where the migration process may be interrupted. Also, one or more of the migration operations performed by the export module 111 and/or the import module 113 may be repeated, for instance, for verification purposes. For example, the import module 113 may initially provide the translated commands to a testing environment, which can execute the translated commands to verify that the resulting data in the second format is accurate. After verification, the import module 113 may then provide the translated commands to the production environment of the second system 105b for execution thereby. The import module 113 may also be implemented such that it can be executed multiple times against a single target system, so that it can operate even if some data/entities have already been imported. As such, operations of the import module 113 can be interrupted and need not be continuous.

Furthermore, after the export of the data 130a,135a from the first system 105a, the migration utility 115 may be further configured to clear the data 130a, 135a from the first system 105a and then import the data 130a, 135a back into the first system 105a according to the migration techniques described herein. For example, after the export module 111 generates the commands 123, the import module 113 may translate the commands 123 into commands that are executable by the first system 105a (for instance, using the first system's public API 125a), and then provide the translated commands back to the first system 105a to be executed thereby, thereby recreating the data 130a, 135a. By recreating the data 130a, 135a at the first system, the data can be cleaned or cleansed with respect to inconsistencies and/or orphaned data that may no longer be relevant to the operation of the first system 105a and/or users thereof.

While described above with reference to physical systems, the first and second systems 105a and 105b may represent any combination of physical and/or virtual systems. Also, although discussed above with reference to file data 130a, 130b and database data 135a, 135b, it will be understood that other data stored in a source system 105a, including operating system(s) and/or application(s), may be migrated to a destination system 105b in accordance with embodiments of the present disclosure. As such, the migration utility 115 may be configured to migrate operating systems, applications, and/or other data between first and second physical systems, between first and second virtual systems, between a physical system and a virtual system (for example, physical-to-virtual (P2V) migration), or between a virtual system and a physical system.

Figure 2:
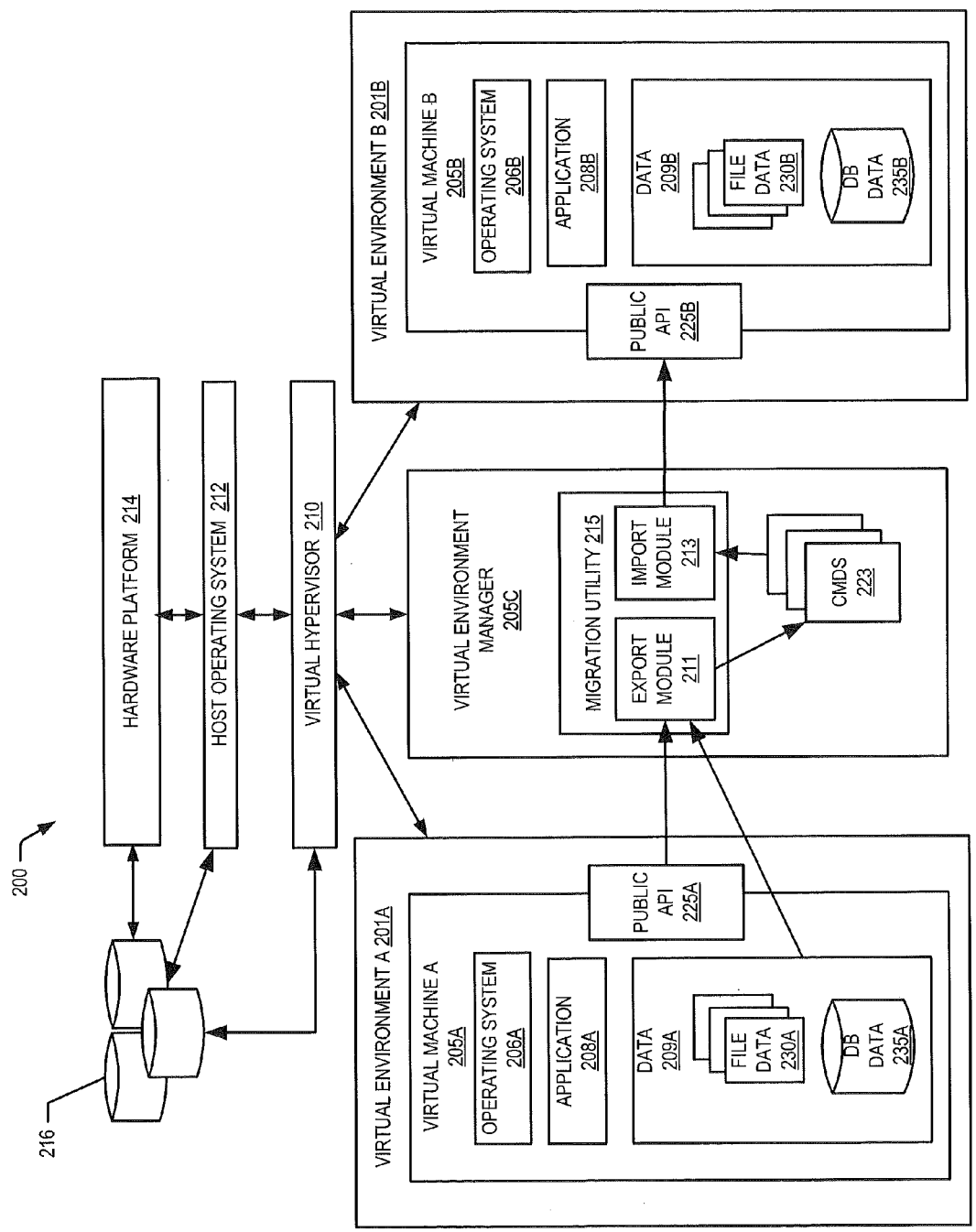
FIG. 2 is a block diagram illustrating a virtual computing system that supports command-based data migration in accordance with an embodiment of the present disclosure.

FIG. 2 is a block diagram illustrating an example of a virtual computing environment that supports command-based data migration in accordance with an embodiment of the present disclosure. The computing system 200 generally hosts and manages one or more managed machines (such as virtual machine 205a, 205b). A virtual hypervisor 210 can provide an interface between the managed machines 205a, 205b and a host operating system 212 and allow multiple guest operating systems 206a, 206b and associated applications 208a, 208b to run concurrently. The host operating system 212 handles the operations of a hardware platform 214 capable of implementing the managed machines 205a, 205b. A data storage space 216 may be accessed by the host operating system 212 and is connected to the hardware platform 214.

The hardware platform 214 generally refers to any computer system capable of implementing managed machines 205a, 205b, which may include, without limitation, a mainframe computer platform, personal computer, mobile computer (e.g., tablet computer), server, wireless communication terminal (e.g., cellular data terminal), or any other appropriate program code processing hardware. The hardware platform 214 may include computer resources such as a processing circuit(s) (e.g., central processing unit, CPU); networking controllers; communication controllers; a display unit; a program and data storage device; memory controllers; input devices (such as a keyboard, a mouse, etc.) and output devices such as printers. The processing hardware may include circuit(s) configured to execute computer program code from memory device(s), described below as a computer readable storage medium, to perform at least some of the operations and methods described herein, and may be any conventional processor circuit(s), such as the AMD Athlon™ 64, or Intel® Core™ Duo.

The hardware platform 214 may be further connected to the data storage space 216 through serial or parallel connections. The data storage space 216 may be any suitable device capable of storing computer-readable data and program code, and it may include logic in the form of software applications, random access memory (RAM), or read only memory (ROM), removable media, or any other suitable memory component. According to the illustrated embodiments, the host operating system 212 functionally interconnects the hardware platform 214.

Besides acting as a host for computing applications that run on the hardware platform 214, the host operating system 212 may operate at the highest priority level in the system 200, executing instructions associated with the hardware platform 214, and it may have exclusive privileged access to the hardware platform 214. The priority and privileged access of hardware resources affords the host operating system 212 exclusive control over resources and instructions, and may preclude interference with the execution of different application programs or the operating system. The host operating system 212 can create environments 201a, 201b for implementing a virtual machine, hosting the "guest" virtual machines 104. One host operating system 212 can be capable of implementing multiple isolated virtual machines and/or environments simultaneously.

The virtual hypervisor 210 (which may also be known as a virtual machine monitor/manager or VMM) runs on the host operating system 212 and provides an interface between the managed machines 205a, 205b and the hardware platform 214 through the host operating system 212. The hypervisor 210 virtualizes the computer system resources and facilitates the operation of the managed machines 205a, 205b. The hypervisor 210 may provide the illusion of operating at the highest priority level to the guest operating systems 206a, 206b. However, the virtual hypervisor 210 can map the guest operating system's priority level to a priority level lower than the top most priority level. As a result, the virtual hypervisor 210 can intercept the guest operating systems 206a, 206b, and execute instructions that require virtualization assistance. Alternatively, the virtual hypervisor 210 may emulate or actually execute the instructions on behalf of the guest operating systems 206a, 206b. Software steps permitting indirect interaction between the guest operating systems 206a, 206b and the physical hardware platform 214 can also be performed by the virtual hypervisor 210. When operating in a virtualized environment, the managed machines 205a, 205b present a virtualized environment to the guest operating systems 206a, 206b, which in turn provide an operating environment for applications 208a, 208b and other software constructs.

More particularly, as shown in FIG. 2, the virtual computing system 200 includes a first or source virtual machine 205a in a first virtual environment 201a, a second or destination virtual machine 205b in a second, different virtual environment 201b, and a virtual environment manager 205c including a migration utility 215 that is configured to migrate data from the first virtual machine 205a to the second virtual machine 205b. The first virtual machine 205a includes a plurality of data 209a stored therein, such as file data 230a and database data 235a. The file data 230a and database data 235a are stored in the first virtual machine 205a according to a first data format or structure that is associated with the first virtual machine 205a, thereby defining a first state in the first virtual machine 205a. However, the second virtual machine 205b is configured to use data having a second data format or structure that is different from and/or otherwise incompatible with that used by the first virtual machine 205a. As such, the data 209a stored in the first virtual machine 205a may be unusable by the second virtual machine 205b, due to the different data formats.

The migration utility 215 is configured to reconstruct or recreate the data 209 in accordance with the second format, such that data 209b including file data 230b and database data 235b can be stored in the second virtual machine 205b to result in a state that is equivalent to that of the first virtual machine 205a with respect to the migrated data. In particular, the migration utility 215 includes an export module 211 and an import module 213. The export module 211 is configured to extract data to be migrated (such as the data 209a) from the first virtual machine 205a. In extracting the data 209a, the export module 211 may utilize a public application program interface (API) 225a that is associated with the first virtual machine 205a. Based on the extracted data 209a itself and/or other knowledge of the virtual machine 205a, the export module 211 is configured to determine how the data 209a was created, originated, or otherwise came to be stored or in the first virtual machine 205a, and to generate one or more commands 223 that are indicative of the origin of the data 209a with respect to the first virtual machine 205a, The commands 123 may be higher-level (e.g. non-native) commands or other commands that are independent of or otherwise unrelated to the particular implementations of the first virtual machine 205a and/or the second virtual machine 205b.

The import module 213 is configured to retrieve the commands 123 generated by the export module 211, translate these commands 223 into one or more commands (for example, lower level/native commands) that are configured to be executed by the second virtual machine 205b, and provide the translated commands to the second virtual machine 205b for execution. In translating the commands 223 into commands that are executable by the second virtual machine 205*b*, the import module 213 may utilize a public application program interface (API) 225*b* that is associated with the second virtual machine 205*b*. In some embodiments, the import module 213 may be configured to first provide the translated commands to a testing environment to verify that the translated commands indeed result in the desired data 209*b*, prior to providing the translated commands to the second virtual machine 205*b*.

After receiving the translated commands from the import module 213, the second virtual machine 205*b* is configured to execute the translated commands to re-create the data 209 stored in the first virtual machine 205*a* in the second virtual machine 205*b* in accordance with the second format, resulting in the file data 230*b* and database data 235*b*. The second virtual machine 205*b* is configured to store the resulting data 230*b*, 235*b* having the second format at appropriate locations therein, thereby defining a virtual system state in the second virtual machine 205*b* that is equivalent to the virtual system state of the first virtual machine 205*a* with respect to the data 230*a*, 235*a* stored therein.

Figure 5:
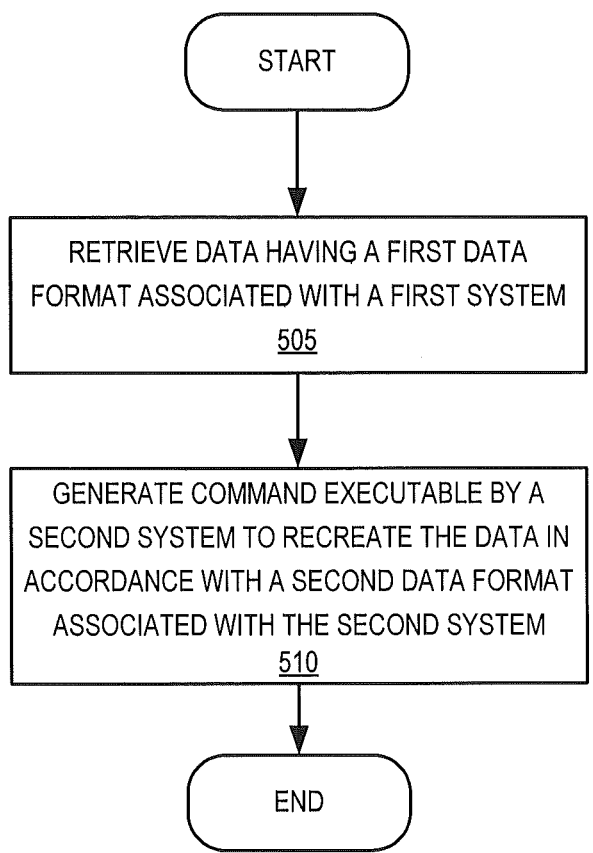
FIGS. 5-7 are flowcharts illustrating operations for providing command-based data migration in accordance with embodiments of the present disclosure.

Operation of the computing environments shown in FIGS. 1 and 2 will now be described with reference to the flowchart of FIG. 5. In particular, when data stored in the first system 105*a*/205*a* is to be migrated to the second system 105*b*/205*b*, the migration utility 115/215 is configured to retrieve the data 130*a*/230*a*, 135*a*/235*a* having the first data format associated with the first system 105*a*/205*a* (block 505), and generate one or more commands that are executable by the second system 105*b*/205*b* to re-create the data in accordance with the second data format associated with the second system 105*b*/205*b* (block 510). The operations performed by the respective exporter 111/211 and importer 113/213 components of the migration utility 115/215 in recreating the data from the first/source system in accordance with the format of the second/destination system are described in greater detail below.

Figure 3:
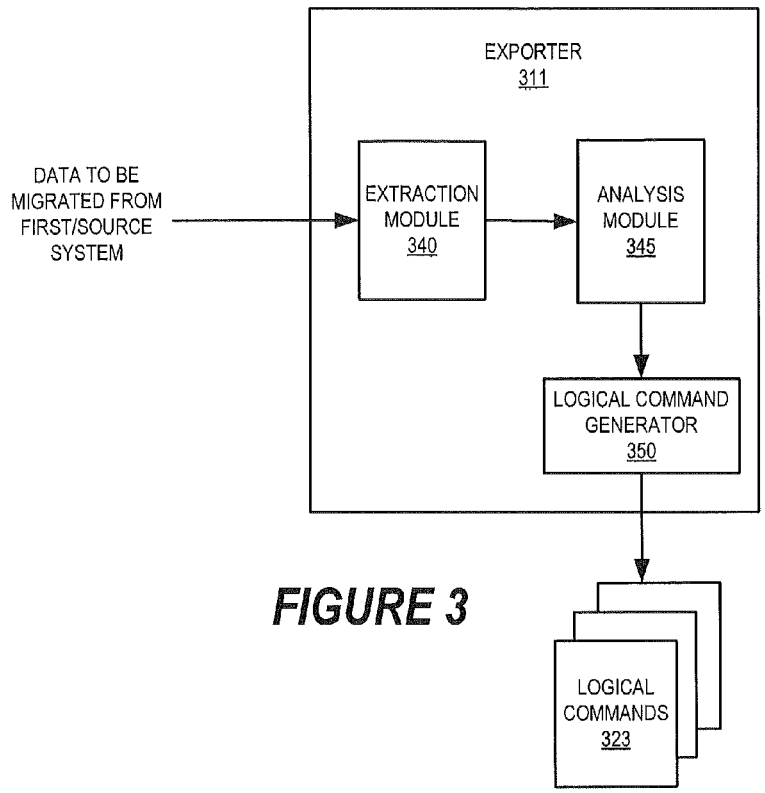
FIG. 3 is a block diagram illustrating an exporter module of a command-based data migration utility in accordance with an embodiment of the present disclosure.
Figure 6:
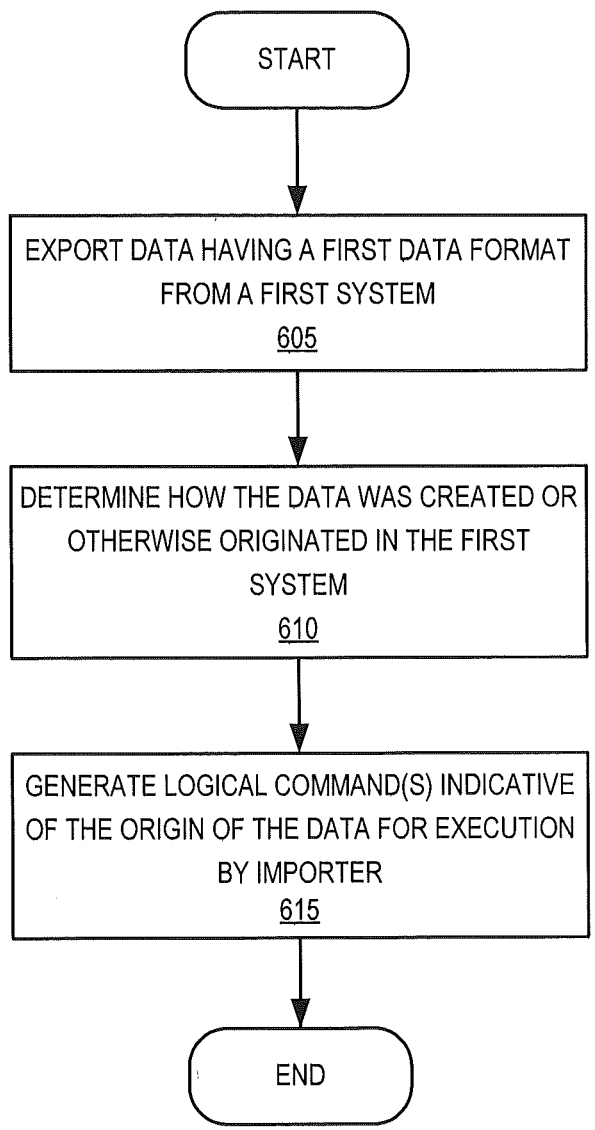

FIG. 3 is a block diagram illustrating an exporter module of a command-based data migration utility in accordance with an embodiment of the present disclosure, and FIG. 6 is a flowchart illustrating operations that may be performed by the exporter module of FIG. 3. The exporter 311 and the operations performed thereby may correspond to those of the export modules 111 or 211 of FIGS. 1 and 2. Referring now to FIG. 3, the exporter 311 includes an extraction module 340, an analysis module 345, and a logical command generator 350. The extraction module 340, the analysis module 345, and the logical command generator 350 cooperatively operate to generate one or more logical commands 323, which are indicative of how the data to be migrated was originated or otherwise came to be stored in a first/source system.

Operation of the exporter 311 of FIG. 3 will be described with reference to the flowchart of FIG. 6. The extraction module 340 is configured to export the data to be migrated from the first system (block 605). For example, the extraction module 340 may use a public application program interface (API) associated with the first system to extract the data having the first format therefrom. The analysis module 345 is configured to determine an origin of the data having the first data format or structure in the first system (block 610). In particular, based on the exported data itself and/or other knowledge of the first system (such as from user commentation), the analysis module 345 may determine the physical layer or native command(s) executed by the first system that resulted in the data to be migrated (e.g., how the data was created). Additionally or alternatively, the analysis module 345 may determine (from the exported data) the source from which the data was imported into the first system (e.g., where the data came from). The analysis module 345 may further analyze the relationships, modifications, configuration settings, and/or user preferences indicated by the exported data to determine how the data was originated. More generally, the analysis module 345 is configured to determine one or more actions or commands that were performed (with respect to the first system) to result in the current system state in which the data to be migrated was stored therein.

Still referring to FIGS. 3 and 6, based on the results provided by the analysis module 345, the logical command generator 350 is configured to create or generate one or more logical commands 323 that are indicative of the origin(s) of the exported data (block 615). For example, the logical command generator 350 may generate the logical command(s) based on the physical command(s) or other actions that were performed with respect to the first system to create or otherwise result in the data to be migrated, as determined by the analysis module 345. The logical commands 323 may be higher level or non-native commands that are independent of and/or otherwise unrelated to the underlying physical layers or other implementations of the first system and/or the second system. The logical commands 323 may be configured to be interpreted by an importer module (such as the importer 413 discussed below).

Figure 4:
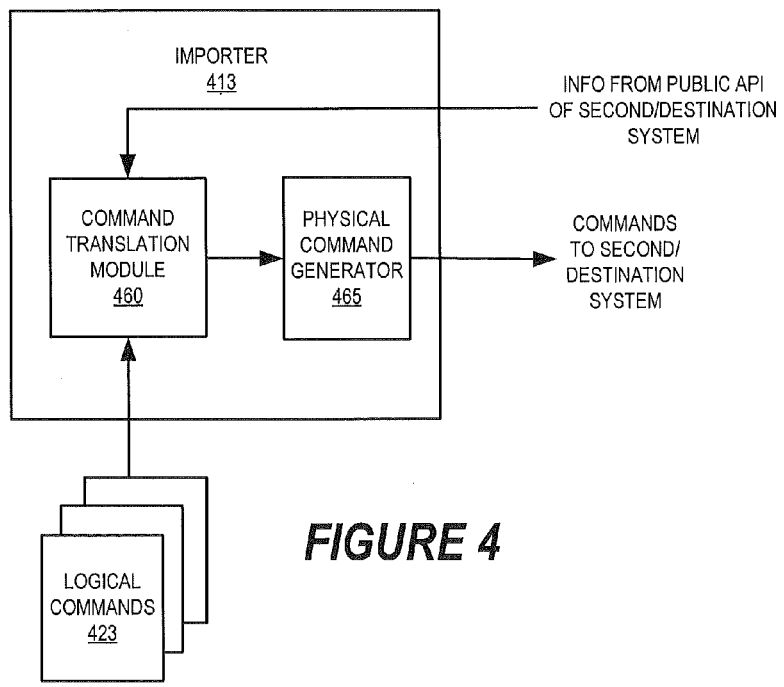
FIG. 4 is a block diagram illustrating an importer module of a command-based data migration utility in accordance with an embodiment of the present disclosure.
Figure 7:
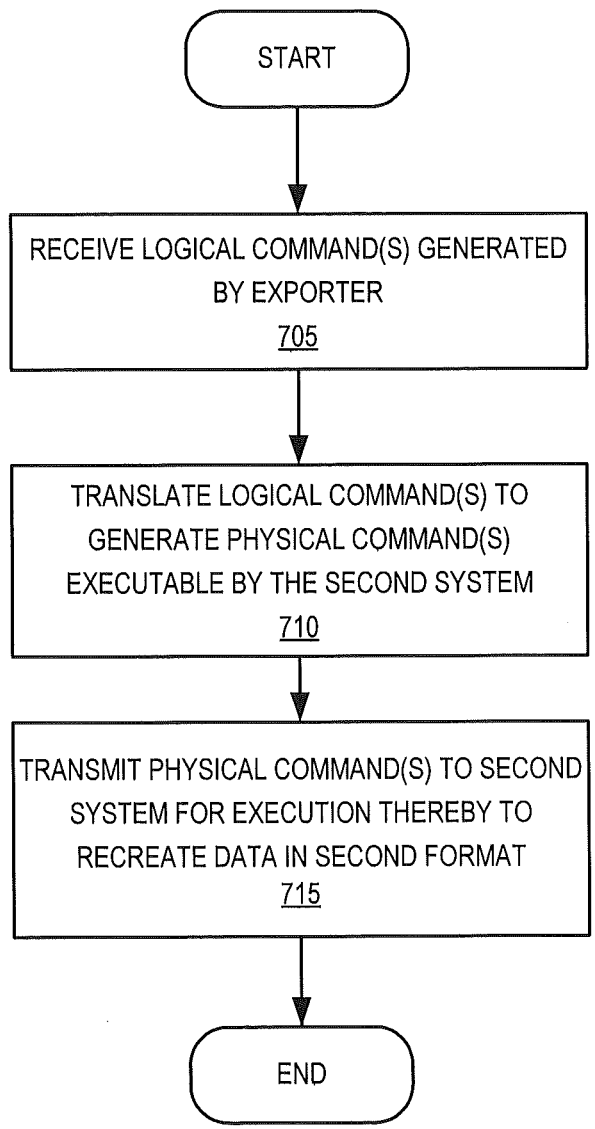

FIG. 4 is a block diagram illustrating an importer module of a command-based data migration utility in accordance with an embodiment of the present disclosure, and FIG. 7 is a flowchart illustrating operations that may be performed by the importer module of FIG. 4. The importer 413 and the operations performed thereby may correspond to those of the import modules 113 or 213 of FIGS. 1 and 2. Referring now to FIG. 4, the importer 413 includes a command translation module 460, and a physical command generator 465. The command translation module 460 and the physical command generator 465 cooperatively operate to generate one or more physical (e.g., physical layer) commands, which are executable by a second/destination system to recreate the data stored on the first/source system in a second data format. The operations of the command translation module 460 and the physical command generator 465 with respect to the second/destination system may be performed separately and/or independently from the operations of the exporter, which may reduce and/or minimize downtime of the first/source system during the migration process.

Operation of the importer 413 of FIG. 4 will be described with reference to the flowchart of FIG. 7. The command translation module 460 is configured to receive one or more logical commands 423 generated by an export module (such as the exporter 311 described above) (block 705). The logical commands 423 are indicative of how the data exported from the first system was originated, for example, based on information contained in the data itself and/or other knowledge of the source system. The logical command(s) 423 may also be higher level commands that are independent of and/or otherwise unrelated to the implementations of the first system and/or the second system. The command translation module 460 is thus configured to translate or map the logical command(s) 423 to physical or native command(s) that are executable by the second system (block 710). For example, the command translation module 460 may use information from a public software interface (such as a public API) of the second system in mapping the logical commands 423 to the physical commands, thereby ensuring that the physical commands are supported by the second system.

Still referring to FIGS. 4 and 7, the physical command generator 465 is configured to generate the physical or native command(s) indicated by the command translation module 460, and to transmit the physical or native command(s) to the second system for execution thereby to recreate the data in the second format (block 715). For example, where one of the logical 423 commands indicates that data was imported from a particular source, the corresponding physical command can be executed at the second system to import the data from the same source. The physical commands provided by the importer module 413 can be run on a clean or empty target/destination system, as well as on a non-empty target system. Also, one or more instances of the physical commands can be initially provided to a testing environment or other non-production environment(s) for execution to verify that resulting data in the second format is accurate, prior to providing the physical commands to the second system for execution thereby.

By executing physical or native commands derived from the second system's public software interface at the second system to recreate the data in the second format (rather than mapping the data from the first format to the second format), inconsistencies that might otherwise arise when writing/storing the data to the second system may be reduced and/or avoided. For example, documentation with respect to the second system's public API may be more readily available than with respect to the second system's data format(s), such that corruption of data created based on such documentation may be less likely. Thus, the integrity of the migrated data can be preserved throughout the entirety of the migration process, as well as for subsequent processes. Furthermore, by using the public software interface of the second system in the import process, the underlying hidden logic of the second system can be preserved.

The following example will be discussed with reference to the operations of the exporter and the importer shown in FIGS. 6 and 7, respectively. It will be understood that the operations of FIGS. 6 and 7 can be performed independent of one another, such that the source system may not be required to wait until the data stored therein has been migrated to the destination system, which can reduce and/or minimize downtime of the source system during the migration process. In particular, as shown in FIG. 6, data to be migrated from a source system to a destination system is exported or extracted from the source system (block 605). The exported data contains an acknowledged alert stored in accordance with the source system's data structure or other format. In some embodiments, the exported data may be read from the source system using its public API. Based on information evident from the acknowledged alert and/or knowledge of the source system, it is determined how the acknowledged alert was created or otherwise originated in the source system (block 610). In particular, it is determined that, in the source system, alerts are typically created first (for example, in response to a 'create' command) and then acknowledges (for example, in response to an 'acknowledge' command). As such, rather than simply transferring the alert with the acknowledged flag set to the destination system, logical commands are generated that indicate the origin of the acknowledged alert in the source system (block 615). In particular, two logical commands are created: (1) A='createAlert(property1=value1, property2=value2, . . . ),' and (2) 'acknowledgeAlert(A).' These two commands are higher level commands that are independent of or otherwise unrelated to the underlying physical layer or other implementations of the source and destination systems.

As shown in FIG. 7, the logical commands createAlert' and 'acknowledgeAlert' generated by the exporter are received by the importer (block 705). These logical commands are translated or mapped to physical commands that are executable by the destination system (block 710). In particular, the logical commands createAlere and 'acknowledgeAlert' may be mapped to the physical commands executable by the destination system to create the alert in accordance with the destination system's data structure or format and then acknowledge the alert. In some embodiments, the translation may utilize the destination system's public API in order to determine that the corresponding physical commands are executable by the destination system, as the destination system's public API may often be better documented than the underlying data structures of the destination system. The corresponding physical commands are then provided to the destination system for execution thereby to recreate and acknowledge the alert in accordance with the destination system's data structure or format (block 715). By recreating and acknowledging the alert at the destination system (rather than mapping the acknowledged alert from the source format to the destination format), it can be ensured that the data integrity with respect to the acknowledged alert is preserved throughout the migration process (as well as for subsequent operations). The acknowledged alert may then be stored in the destination system, resulting in an equivalent system state as that of the source system including the acknowledged alert stored therein.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

In the drawings and specification, there have been disclosed typical embodiments and, although specific terms are employed, they are used in a generic and descriptive sense only and not for purposes of limitation, the scope of the invention being set forth in the following claims.

That which is claimed:

1. A data migration method, comprising:
performing operations as follows on a processor:
in an export operation, retrieving data that is to be migrated, the data having a first data format associated with a first system;
determining an origin of the data having the first data format, wherein determining the origin comprises determining a first command that is executable by the first system to result in the data having the first data format, which is to be migrated; and
in an import operation, generating a second command based on the first command, wherein the second command comprises a physical command that is native to a second system, and wherein generating the second command based on the first command comprises:
creating a logical command that is non-native to the first system is indicative of the first command that is executable by the first system to result in the data having the first data format, which is to be migrated; and
translating the logical command to the physical command that is native to the second system, wherein the physical command is executable by the second system to recreate the data in accordance with a second data format associated with the second system based on the origin and without translating the data having the first data format to the second data format.

2. The method of claim 1, wherein generating comprises generating the second command independent of relating the first data format to the second data format.

3. The method of claim 1, wherein generating comprises generating the second command according to a public software interface associated with the second system.

4. The method of claim 1, wherein the physical command that is native to the second system comprises a second physical command, wherein the first command comprises a first physical command that is native to the first system, and wherein determining the origin comprises:
determining the first physical command that is native to and executable by the first system to result in the data having the first data format, which is to be migrated,
wherein the logical command is indicative of the first physical command that is native to and executable by the first system.

5. The method of claim 1, wherein determining the origin further comprises determining a source from which the data having the first format, which is to be migrated, was imported into the first system,
wherein the second command is executable by the second system to import the data into the second system from the source from which the data to be migrated was imported into the first system.

6. The method of claim 1, wherein determining the origin comprises analyzing one of a relationship, modification, configuration setting, and user preference associated with the data having the first format.

7. The method of claim 1, wherein generating comprises generating the second command independent of operation of the first system after retrieving the data therefrom.

8. The method of claim 1, further comprising:
providing the second command to the second system for execution thereby to define a system state in the second system including the data having the second data format that is equivalent to a system state of the first system with respect to the data having the first data format.

9. The method of claim 8, further comprising:
providing the second command to a testing environment for verification prior to providing the command to the second system for execution thereby.

10. The method of claim 1, further comprising:
translating the logical command to a physical command that is executable by the first system to recreate the data in accordance with the first data format responsive to determining the origin of the data having the first data format; and
providing the physical command that is executable by the first system to the first system for execution thereby.

11. A computer system, comprising:
a processor; and
a memory coupled to the processor and comprising computer readable program code embodied therein, the computer readable program code comprising a data migration utility comprising an exporter module and an importer module,
wherein, when executed by the processor, the exporter module causes the processor to retrieve data that is to be migrated, the data having a first data format associated with a first system, determine an origin of the data having the first data format, wherein the origin comprises a first command that is executable by the first system to result in the data having the first data format, which is to be migrated, and create a logical command that is non-native to the first system and is indicative of the first command, and
wherein, when executed by the processor, the importer module causes the processor to generate a second command based on the first command, wherein the second command comprises a physical command that is native to a second system, by translating the logical command to the physical command, wherein the physical command is executable by the second system to recreate the data in accordance with a second data format associated with the second system based on the origin and without translating the data having the first data format to the second data format.

12. The system of claim 11, wherein the importer module is to generate the second command independent of relating the first data format to the second data format.

13. The system of claim 11, wherein the importer module is to generate the second command according to a public software interface associated with the second system.

14. The system of claim 11, wherein the physical command that is native to the second system comprises a second physical command, wherein the first command comprises a first physical command that is native to the first system, and wherein the exporter module is to determine the first physical command that is native to and executable by the first system to result in the data having the first data format, which is to be migrated, and wherein the logical command is indicative of the first physical command that is native to and executable by the first system.

15. The system of claim 11, wherein the importer is to provide the second command to the second system for execution thereby to define a system state in the second system including the data having the second data format that is equivalent to a system state of the first system with respect to the data having the first data format.

16. A computer program product for data migration, the computer program product comprising:

a non-transitory computer readable storage medium having computer readable program code embodied in the medium, the computer readable program code comprising:

computer readable program code to retrieve, in an export operation, data that is to be migrated, the data having a first data format associated with a first system;

computer readable program code to determine an origin of the data having the first data format, wherein the origin comprises a first command that is executable by the first system to result in the data having the first data format, which is to be migrated; and computer readable program code to generate, in an import operation, a second command based on the first command, wherein the second command comprises a physical command that is native to the second system, and wherein the computer readable program code to generate the second command based on the first command comprises:

computer readable program code to create a logical command that non-native to the first system arid indicative of the first command that is executable by the first system to result in the data having the first data format, which is to be migrated; and computer readable program code to translate the logical command to the physical command that is native to the second system, wherein the physical command is executable by the second system to recreate the data in accordance with a second data format associated with the second system based on the origin and without translating the data having the first data format to the second data format.

17. The computer program product of claim 16, wherein the computer readable program code is to generate the second command independent of relating the first data format to the second data format.

18. The computer program product of claim 16, wherein the computer readable program code is to generate the second command in accordance with a public software interface associated with the second system.

19. The computer program product of claim 16, wherein the physical command that is native to the second system comprises a second physical command, wherein the first command comprises a first physical command that is native to the first system, and wherein the computer readable program code to determine the origin of the data having the first data format in the first system comprises:

computer readable program code to determine the first physical command that is native to and executable by the first system to result in the data having the first data format, which is to be migrated, wherein the logical command is indicative of the first physical command that is native to and executable by the first system.

20. The computer program product of claim 16, further comprising:

computer readable program code to provide the second command to the second system for execution thereby to define a system state in the second system including the data having the second data format that is equivalent to a system state of the first system with respect to the data having the first data format.

* * * * *